Dec. 26, 1939. A. E. FREEMAN ET AL 2,184,912
CABLE AND WIRE LAYING MACHINE
Filed Nov. 5, 1937 3 Sheets-Sheet 1

INVENTORS
A. E. Freeman and T. C. Smith
BY William R. Ballard
ATTORNEY

Dec. 26, 1939.   A. E. FREEMAN ET AL   2,184,912
CABLE AND WIRE LAYING MACHINE
Filed Nov. 5, 1937   3 Sheets—Sheet 2
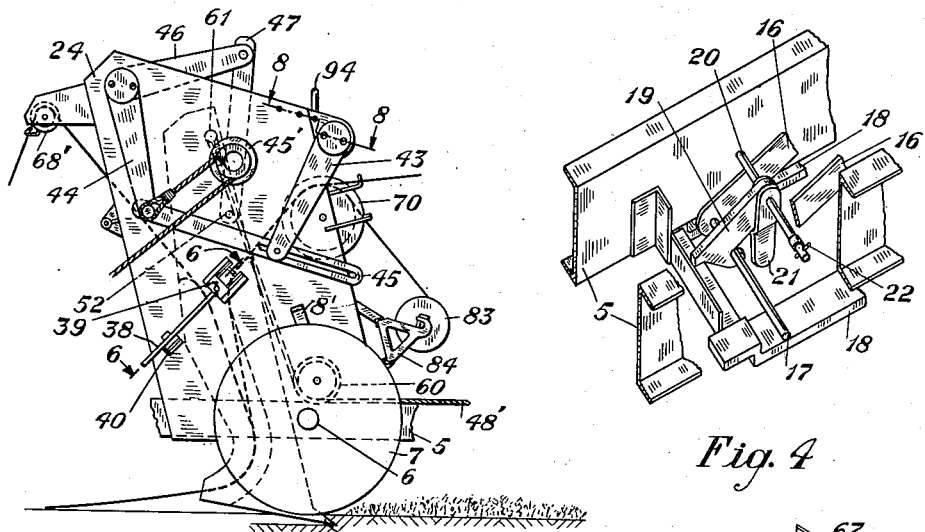
Fig. 3
Fig. 4
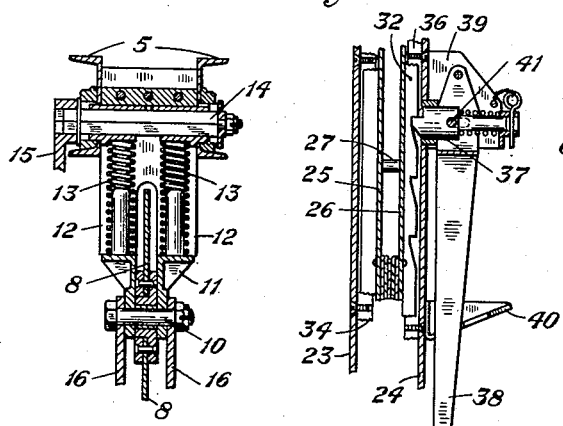
Fig. 5
Fig. 6
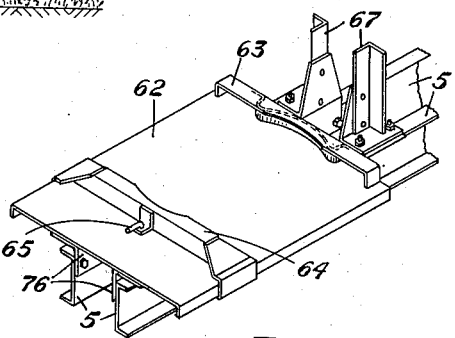
Fig. 7
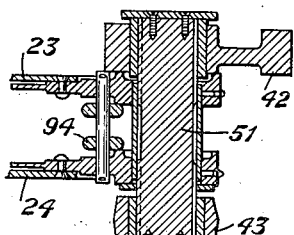
Fig. 8
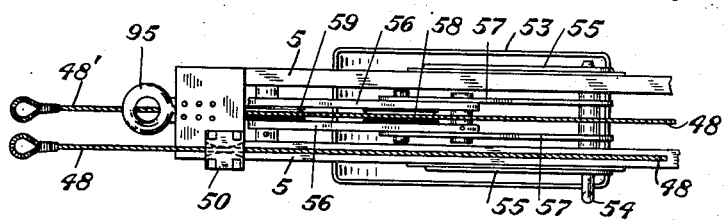
Fig. 9
INVENTORS
A.E.Freeman and T.C.Smith
BY William R Willard
ATTORNEY Dec. 26, 1939.  A. E. FREEMAN ET AL  2,184,912
CABLE AND WIRE LAYING MACHINE
Filed Nov. 5, 1937   3 Sheets-Sheet 3

INVENTORS
A. E. Freeman and T. C. Smith
BY William R. Ballard
ATTORNEY

Patented Dec. 26, 1939

2,184,912

UNITED STATES PATENT OFFICE 2,184,912

CABLE AND WIRE LAYING MACHINE

Albert Edward Freeman, South Orange, and Temple Clifford Smith, Westfield, N. J., assignors to American Telephone and Telegraph Company, a corporation of New York Application November 5, 1937, Serial No. 173,040

7 Claims. (Cl. 111—5)

This invention relates to machines such as plows, which are adapted to lay cables or wires beneath the surface of the ground.

It is an object of the invention to provide an arrangement of the above character which is capable of rapidly laying cables or wires under the ground by forming a furrow or trench in the ground and laying the cables or wires therein as the machine advances.

In accordance with this invention, a truck or tractor-drawn machine or plow is provided with a coulter for preliminary opening of the ground in front of a plowshare. The plowshare is adjusted to enter the ground to a desired depth to form a trench therein. Reels of cable or wire are carried by the plow, or may be carried by the towing truck or a trailer, and the cable or wire from these reels is simultaneously fed, through guide channels formed in the plowshare, into the trench at the same rate of speed as the advance of the plow. As the plow advances the walls of the trench fill in behind it, burying the cables or wires.

The invention will be more fully understood from the following description, when considered in connection with the accompanying drawings in which one embodiment thereof is illustrated.

Referring to the drawings,

Fig. 3 is a side elevation of one of the vertically extending side-plates of the main frame upon which are mounted toggle members and associated equipment by which the plowshare is operated to a raised position;

Fig. 4 is a perspective view of the mechanism associated with the coulter taken on the line 4—4 of Fig. 2 looking in the direction of the arrows;

Fig. 5 is a sectional view of the coulter blade and its associated elements taken on the line 5—5 of Fig. 1, the lower portion of the blade being cut away;

Fig. 6 is a sectional view illustrating ratchet mechanism taken on the line 6—6 of Fig. 3, by which the plowshare may be adjusted to lowered positions;

Fig. 7 is a perspective view showing the platform upon which a single cable reel is supported;

Fig. 8 is a sectional view taken on the line 8, 8 of Fig. 3, showing a shaft upon which a segment of one of the toggle members for operating the plowshare is mounted;

Fig. 9 is a plan view of the front end of the plow, showing the positions of the steel cables and associated pulleys by which the plowshare is raised or lowered;

Figure 1:
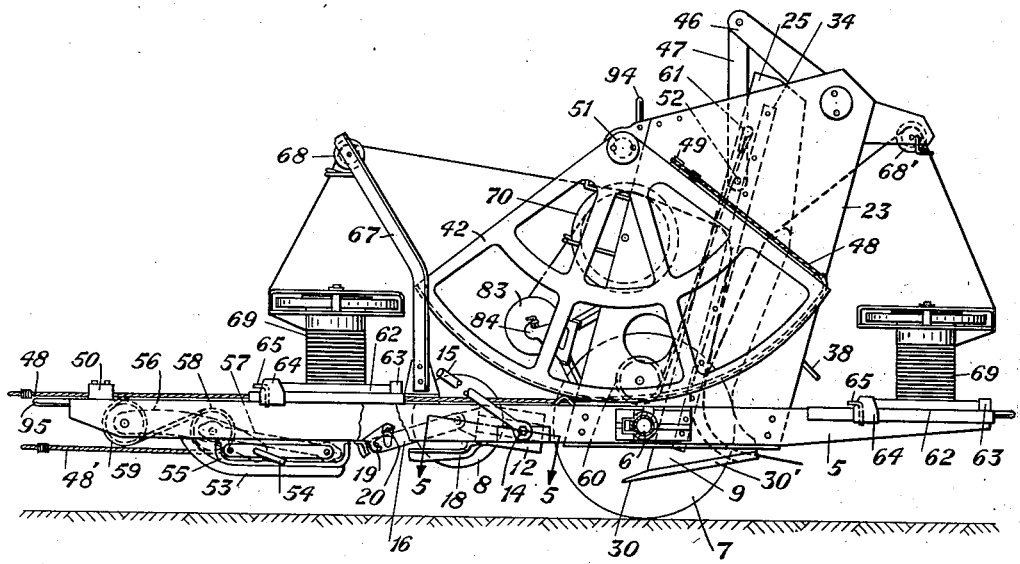
Figure 1 is a side elevation of the improved device, showing the plowshare with its associated wire or cable guide tubes, together with a coulter and skid-shoe illustrated in carried or raised positions.

The cable or wire-laying arrangement, as shown in the drawings, includes a frame or plowbeam 5 which is made narrow in width and comprises a pair of parallel longitudinally extending channel members. The channel members are journalled on an axle 6, which extends through casting or bearings in the channel members, and is mounted on suitable wheels 7, 7. The frame is adjustably mounted so that it may be shifted sidewise along the axle, as will be presently described. One or both of the wheels may be equipped, if desired, with any suitable form of braking mechanism, (not illustrated), the control lever of which is shown at 8' in Fig. 3 of the drawings.

A rotary coulter 8 is adjustably supported on the frame 5 in front of a plowshare 9. This coulter is rotatably carried upon a bolt 10, extending through a lug at the bottom of a casting 11. This casting is welded to parallel channel members 12, 12 which are suitably held in spaced relation as shown in Fig. 5. Springs 13, 13, duly held in centered positions, are carried by the casting 11 and bear against a hollow member which surrounds a hexagonal bolt 14. This bolt extends through the channel members of the frame 5, and one end of the bolt is adapted to have a wrench handle 15 applied thereto for the purpose of forcing the coulter into the ground when desired. A floating structure is provided by the channel members 12, 12 and the springs 13, 13 exert downward pressure against the coulter through the floating structure to cause the coulter to follow the contour of the ground. A pair of parallel links 16 are attached at one end to the extremities of the bolt 10 and are interconnected at their other ends by a rod 17 (Fig. 4), which rod rests upon side castings 18, 18 secured to the under sides of the channel members of the frame. The rod 17 is engaged by a latch carried on the end of lever 19, the other end of the lever being carried on a transverse rod 20 which extends between and is supported on the channel members of the frame 5. One end of this rod extends through one of the channel members and carries a handle 22. A forked lever 21, carried on the rod 20, is adapted to strike the shaft 17 and trip the latch of lever 19 upon the rotation of the handle 22. The unlatching operation just described permits the coulter to be released from its raised or carried position so that it may be dropped to the ground when the wrench handle 15 is slightly turned to relieve the pressure exerted by the rod on the latch 19.

Figure 13:
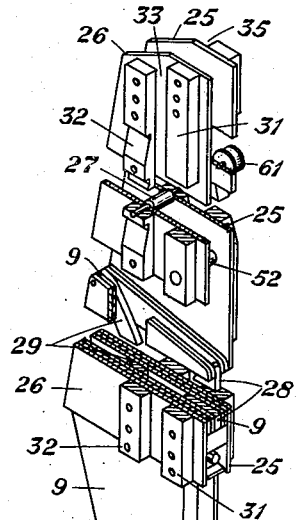
Fig. 13 is a perspective view of the plowshare with portions thereof broken away to illustrate the guide channels extending through the plowshare in which the wires or cables travel.

Plowshare 9, as more clearly illustrated in Fig. 13, is slidably mounted between the channel members of the plow-beam or frame 5 and parallel and vertically disposed side plates 23 and 24 of the main frame. These side plates are suitably fixed by riveting or otherwise to the inner sides of the channel members, as will presently appear. The plowshare is composed of two parallel side portions 25 and 26, which are of similar formation. The upper members of these side portions are maintained in spaced relation by a pipe 27 through which a rod extends and enters holes in the side portions. The lower parts of said portions are maintained in spaced relation by means of guides 28 and 29, which form channels through which the cables or wires pass in their travel through the plowshare 9. The guide 28 is positioned in the forward part of the plowshare and extends downwardly in a slightly curved direction to the rear or heel of the plowshare 30. The guide 29 is positioned at the rear of and follows the same general line of direction as the guide 28 and terminates therewith at the heel of the plowshare. The wire or cable is introduced into and passes through the channel between these guides and is fed through the heel of the plowshare into a trench or furrow, as will be later described. Parallel strips 31 and 32 are mounted on the outer surface of side portion 26 of the plowshare and a suitable space is provided between these strips to form a key-way 33. A corresponding key-way 35 is formed by similarly positioned strips on the opposite surface of the side portion 25 of the plowshare. Keys 34 and 36 (Fig. 10) extending vertically on the inner surfaces of the side plates 23 and 24 of the main frame respectively engage in the key-ways 33 and 35 of the plowshare 9 and permit it to be moved upwardly and downwardly thereon.

The plowshare may be readily pulled out of the frame and replaced by removing the pin from the small end of lever 46 and releasing lever 38, (Fig. 3) then with the plow on its side, sliding the share out through the bottom. Plowshares with various sized passages for wires and cables may be used in the same plow. The plowshare comprises a number of parts including the point 30, and land-sides 30'. The plow and its component parts are constructed to withstand the rigorous conditions involved in operating in various soils, and the wearing parts are so arranged that they may be readily replaced.

Figure 2:
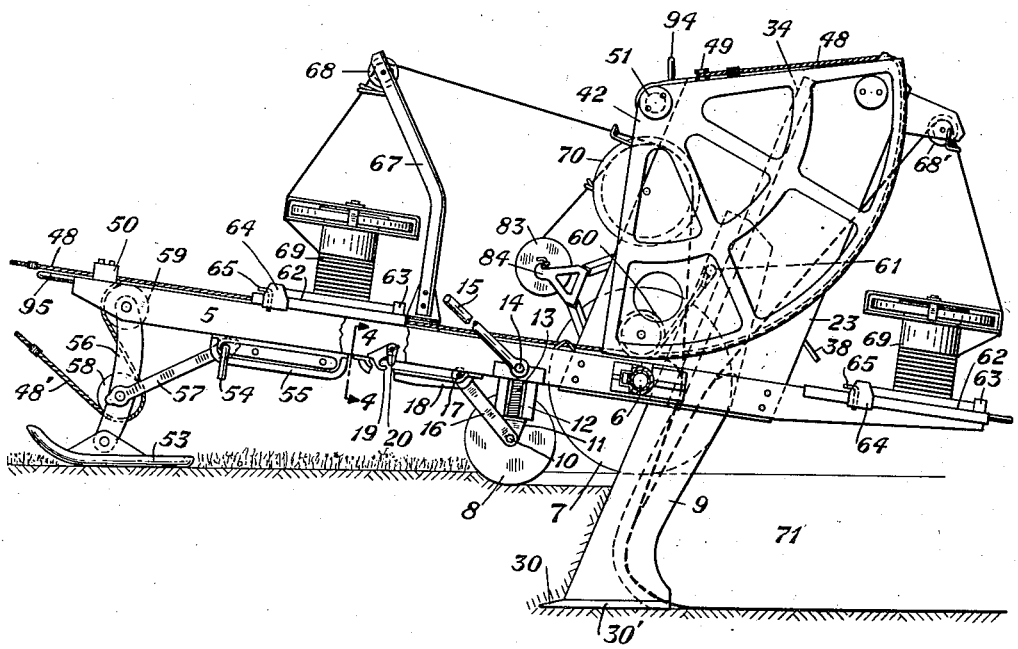
Fig. 2 is a view similar to Fig. 1, but with the elements, just mentioned, lowered to their operating positions.

Ring 94 is hinged on a pin between the side plates at the top of the plow and is used for lifting the plow as in loading or unloading it on or off a truck by means of a derrick (Figs. 1, 2 and 3).

The strip 32 on the side portion 26 of the plowshare has notches provided therein which engage with a spring-controlled detent 37 (Fig. 6). This structure forms a one-way ratchet which serves to maintain the plowshare in a raised or carried position or to maintain the plowshare at a certain depth in the ground when the plowshare is in operating or plowing position, but does not interfere with the raising of the share when so desired. The ratchet mechanism is controlled by a lever 38 which is pivotally mounted on a side bracket 39, carried on the outer surface of the plate 24. On the lower end of the lever is provided a toothed stop 40, over which the lever is pulled to cause disengagement of the detent 37 with the notches on the side strip 32 of the plowshare. For the purpose of maintaining the detent 37 in disengaged position, slots are provided through the upper forked end of the lever 38. A pin 41 passing through the detent engages in the slots and removes the tension by which the detent is kept in engagement. The plowshare is thus unlocked so that it may drop under its own weight to the ground. If it is desired to lower the plowshare gradually or to introduce it gradually into the ground, this may be accomplished by a manual operation. In this case the eye of a rope is applied to the knob extending outwardly from the pivotal connection between toggle levers 44 and 45 (Fig. 3). The rope is then wrapped about snubbing spool or capstan 45' several turns. The lever 38 may be then released and the plowshare lowered into the furrow.

As previously described, the main frame comprising the vertical side plates 23 and 24 are suitably riveted to the inner surfaces of the channel members of the plow frame 5. The side plate 23 carries a casting 42 of sector formation on its outer surface, and the side plate 24 carries a linkage comprising toggle members 43, 44 and 45 on its outer surface. Additional toggle members 46 and 47 are carried between the two side plates 23 and 24.

The sector 42 is shown as having radial arms 55 which extend to an arcuate shaped periphery on which a groove (illustrated by dotted lines in Figs. 1 and 2) is formed. A steel rope 48 is carried in this groove and one end of the rope is secured to a knob 49, provided on one of the arms of the sector. The other end of the rope extends forwardly from the sector and along one of the channel members of the plow frame 5 through a guide-block 50 secured to the top of the channel member at the front of the plow and terminates in an eye which may be attached to a tractor or the like (not shown).

Castings are carried on the inner sides of the plates 23 and 24, as shown in Fig. 8, which form bearings for a shaft 51. The shaft 51 extends beyond these bearings and the projecting ends of said shaft have gear teeth or splined portions. Internal teeth or splines formed in the axial point of the sector 42 engage with one end of the shaft 51 and like teeth or splines formed on the toggle member 43 engage with the other end of the shaft 51. Thus, as the rope 48 is pulled forwardly, it rotates the sector 42 and the shaft 51 in a clockwise direction. Motion in this direction is transmitted by the shaft 51 to the end of the toggle member 43 to which it is geared. The other end of the toggle member 43 is provided with a pin which engages in a slot in the toggle member 45. The pin of the toggle member 43 travels in this slot in a direction toward the forward end of the toggle member 45 when motion is transmitted. At the limit of the travel of the pin in the slot, the toggle member 45 is pulled forwardly, imparting a torque or twisting action on the toggle levers 44 and 46 to which it is connected. These toggle levers are interconnected by a shaft journalled in bearings in the side plates 23 and 24, which shaft has geared or splined ends which engage with internal gearing teeth or splines on the toggle levers 44 and 46 in a manner similar to that described in the connection of the sector 42 and toggle lever 43. The toggle lever 47 is pivotally connected at one end to the toggle lever 46, and its other end is connected to the plowshare by means of the bolt 52, shown in dotted lines in Fig. 3. Thus, when the steel rope 48 is pulled forwardly the sector 42 is rotated, transmitting a rotary motion through the shaft 51 to the various toggle levers comprising the linkage which is connected to the plowshare and it is thus raised. The plowshare is guided in a slightly inclined direction, as shown in Fig. 1 in its key-ways 33 and 35 provided on each of its sides which slidingly engage keys 34 and 36, respectively, on the inner surface of the side plates 23 and 24, as formerly outlined. It will be obvious that in the operation of raising the plowshare, no interference occurs with the other parts of the plow, and the only weight to be lifted is that of the share.

When the plow is ready to be advanced to form a furrow or trench, the shoe 53 will be released from its carried position as shown in Fig. 1 and will assume an operating position on the ground as indicated in Fig. 2. The shoe is released to the latter position by withdrawing the angular pin 54 from the central opening in the casting 55, permitting the shoe to drop to the ground in an extended position. The shoe 53 is of relatively large width to permit it to be advanced along the ground without materially depressing the earth under it. This shoe forms a front end support for the plow, and smooths the way for the coulter 8. The shoe is provided with parallel side flanges between which a bolt extends and a pair of parallel links 56 are connected at one end to this bolt, the other ends of the links being connected to a bolt extending through the channel members of the frame 5. An additional pair of parallel links 57 is connected at one end by a bolt extending through the links 56 at a point intermediate their ends. The other ends of the links 57 are connected to the forward opening in the casting 55 by means of the angular pin 54. It will be seen that this removable pin 54 extends through certain openings in the shoe in its carried position, and through openings in the ends of the links 57 in the operating position of the shoe.

A steel rope 48' is used to pull the plow along the ground and the eye of the rope will be attached to a tractor, truck or the like. The rope extends rearwardly on the plow over pulleys 58 and 59, which are mounted respectively on the bolts extending between the intermediate portion of the links 56 and between the rod which extends between the channel members of the frame 5. The rope then extends over a pulley 60 journalled between the side plates 23 and 24 of the main frame, and is connected to a knob 61 carried by the plowshare 9. The connection of the steel rope 48' to the plowshare 9 over the pulley 60 in the manner just indicated exerts a downward pull on the plowshare which maintains it in the ground at a desired predetermined depth. The arrangement of the pulleys 58 and 59 so adjusts the pulling force on the plow that the tendency of the front end of the plow to lift or to become too heavily depressed upon skid 53, is overcome. The pulling force exerted on the plow in the manner described, balances the up pull of the front of the plow against the down pull resulting from the resistance of the point of the plowshare, as it is pulled through the ground.

Figure 10:
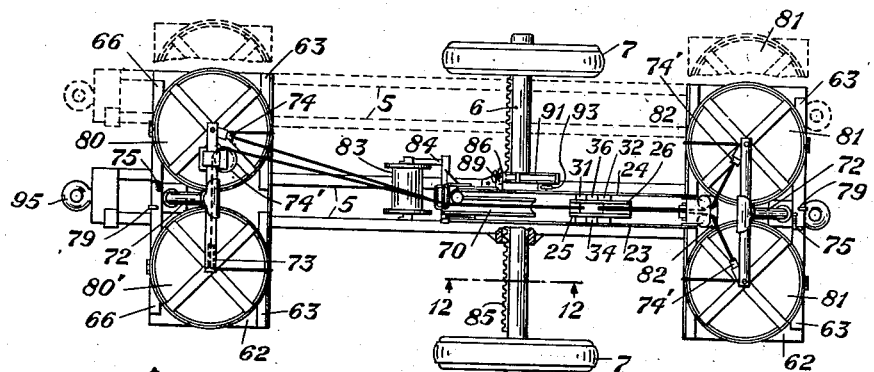
Fig. 10 is a plan view of the plow showing a pair of reels mounted thereon on either side of the plowshare, and illustrating the manner in which the cable or wire is taken from the reels and fed into the plowshare.
Figure 11:
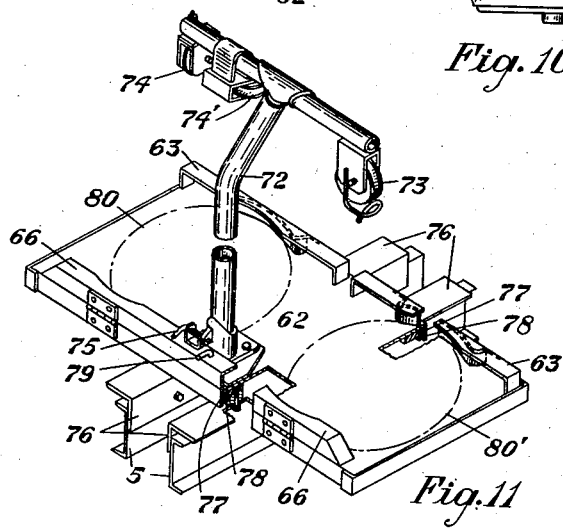
Fig. 11 is a perspective view showing a platform upon which a pair of reels may be supported, and the pulleys which guide the wires or cables from their reels into the plowshare.

The wire or cable which is to be fed into the trench or furrow in the ground is supplied from reels. These reels are positioned on suitable platforms carried by the plow, and the platforms may be of a type adapted to carry a single reel of wire or cable such as shown in Fig. 7 or a pair of reels, such as shown in Fig. 11. The single-reel platforms may be positioned both at the front and rear of the plowshare, as shown in Figs. 1 and 2, or the pair of double-reel platforms may be likewise positioned, as shown in Fig. 10.

The platform for holding a single reel, as shown in Fig. 7, includes a flat supporting surface 62, which overhangs the channel members of the frame 5 to which it is suitably fixed. The rear end of this platform has a casting 63 so raised from the surface of the platform that the flange of a reel may lie between it and the platform surface. This casting has an arcuate portion formed in it corresponding to the contour of the cable or the wire reel. A second casting 64 having a similar arcuate portion is mounted on the opposite end of the platform, the extremities of this casting slidably engaging with the edges of the platform. The casting 64 is provided with a perforated angular bracket through which an angular pin 65 is inserted to engage a corresponding perforation in the platform 62. When the reel is in position, the casting 64 is adjusted to snugly fit against the reel and is locked by the pin to maintain the reel in stationary position.

It is preferred that the reels be provided with rotatable heads to permit the wire or cable carried thereby to be withdrawn with a minimum amount of friction.

The platform for carrying a pair of reels (Fig. 11) may be of similar construction to the single platform just described with respect to its castings 63, 63. In the present case, however, the castings 66, 66, which assist in maintaining the reels in position similarly to the casting 64, are hinged to the flange of the platform. This double-reel platform is adapted to be moved sideways on the channel members of the frame 5 for the purpose of preventing interference in cases where it is desired to plow near a wall or the like, and where the frame carrying the plowshare has been moved sidewise on the axle as will be presently described. In such cases the double-reel platform may be moved to the side of the channel members away from the wall or in a desired direction. A pair of angular plates 76, 76 is bolted or secured to the channel members of the frame 5, and to these plates and beneath the platform a pair of strips 77, 77 is secured. These strips extend laterally and overhang the channel members sufficiently to provide a support for the reel platform. The platform carries a strip 78 along the inside surface of each of its laterally extending flanges. These strips lie beneath the strips 77, 77 and permit the reel platform to be moved laterally along strips 77, 77, and also prevent the platform from tilting when holes or uneven surfaces are encountered. The platform is secured in any desired position by means of an angular pin 79 which is inserted in registering openings in the casting 66 and the front laterally extending strip 77.

An upright 67, suitably mounted on the channel members of the frame 5 carries a sheave 68 at its upper portion, as shown in Fig. 1 in connection with the single platform. Cable or wire from the reel 69 is fed over sheave 68 and over pulley 70, which is journalled between the side plates 23 and 24 of the main frame and is fed into the guide channel 28 extending through the plowshare and thence into the formed furrow or trench as the plow advances, shown at 71 of Fig. 2. Cable or wire from the reel 69, positioned at the rear of the plowshare, is similarly fed through the guide channel 29 of the plowshare. In this latter connection, however, the wire or cable is fed through a sheave 68', carried on a bracket extending from the main frame. The cable or wire is fed through channel between guides 28 and 29 simultaneously.

In connection with the double platform (Fig. 11), an upright 72 is provided having a crossarm at the ends of which pulleys 73, 74 and 74' are carried. This upright is bolted to the platform and an angular pin 75, under spring tension, which is mounted in a bracket on top of the casting 66, serves to lock the casting and reels in position as shown in Fig. 11.

As shown in the plan view of Fig. 10, the cable or wire may be drawn from one reel or from both reels simultaneously. In the case of the wire or cable being drawn from the reel 80, such wire or cable passes over pivotally mounted pulley 74, over pulley 70 through the plowshare, and is fed through the rear of the plowshare into the formed furrow or trench. Where the wire or cable is drawn from the reel 80' the wire or cable passes over pulleys 73 and 74', thence over pulley 70 into the plowshare, and out and into the furrow, as previously described.

The wires or cables from the reels 81, 81 which are mounted upon the platform in the rear of the plowshare, may be fed through the plowshare into the formed furrow simultaneously with the wires or cables from the reels 80 and 80' positioned forwardly of the plowshare. Wires or cables from the reels 81, 81 are fed over pivotally mounted pulleys 74', 74', respectively, which are carried on the crossarm of an upright 72' which is of similar structure to the forwardly positioned upright 72, previously described. The wire or cable is fed over pulleys 82, 82 mounted on the upper part of the side plates 23 and 24 of the main frame, and then through the plowshare and into the furrow or trench as previously outlined.

A reel 83 of shield wire is mounted on a bracket 84 which is bolted to the side plates 23 and 24. This shield wire is fed over the pulley 70 and through the plowshare simultaneously with the feeding of the wire or cable just described. This wire is laid in the furrow or trench and serves as a shield to protect the laid wire or cable from electrical disturbances.

Figure 12:
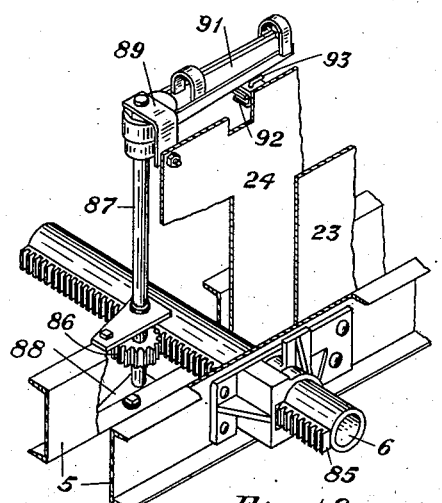
Fig. 12 is a perspective view taken on the line 12—12 of Fig. 10 showing ratchet mechanism by which the plow frame may be moved along the plow axle to permit the plowshare to form a trench at any point between the wheels in accordance with the setting of the frame on the axle.

The plow frame 5 is adapted to be moved sidewise along the axle 6 in either direction to permit trenching close to highway, guard fences, poles, etc. For this purpose a gear rack 85 is permanently fixed to and extends throughout the length of the forward side of the axle. This rack, as shown in Figs. 10 and 12, engages with gear member 86, which is carried on a vertical shaft 87. This shaft is supported at its lower end in a bearing carried by a plate 88 which is secured to the underside of one of the channel members. The other, or upper, end of the shaft is carried in an angular bracket positioned on the side plate 24. The top of the shaft 87 is adapted to be engaged and rotated by a commercial ratchet wrench 91 in the direction it is desired to move the frame 5 along the axle. This wrench may be provided with a plate extending from its handle portion which has an opening therethrough. This opening registers with openings in a U-shaped bracket 92, and a pin 93, introduced through these registering openings, locks the wrench and maintains the plow frame in the position desired.

The plow may be connected to a draft device by means of a tow eye 95.

In the operation of laying and burying wire or cable by means of the present invention, the plowshare is released from its carried position and adjusted to a desired depth in the ground as the plow is pulled forward with the skid in the "collapsed" position. With the skid in this position, the end of the tongue is low and the land-sides at the bottom of the share draw it into the ground. After the share has reached its proper depth the tongue end is raised by lowering the skid and the coulter also is lowered. The skid-shoe will support the front or tongue of the plow and the pressure operated coulter will follow the contour of the ground and prepare the ground for the plowshare. When so adjusted the plow may be towed by the draft device, the rope 48 pulling the plowshare through the ground, as previously described. As the plow advances the wire or cable from the forwardly and rearwardly positioned reels is simultaneously fed through the plowshare and into the furrow formed thereby. In cases where it is desired to form a furrow near a wall, or the like, the plow frame may be adjusted along the axle as desired. The reel-carrying platforms may also be adjusted on the frame, as previously explained.

When it is desired to transport the plow, the plowshare may be raised by the sector-toggle mechanism previously described. The skid-shoe and coulter are also adjusted to their raised positions, and the plow may be towed by a truck or other draft machine.

While the arrangements of this invention have been illustrated as embodied in certain specific forms which have been deemed desirable, it will be understood that they are capable of embodiment in many and widely varied forms without departing from the spirit of the invention as defined in the appended claims.

What is claimed is:

1. A wire and cable-laying plow having a frame, a furrow-forming plowshare vertically adjustable thereon and having guide channels extending therethrough, reels mounted on a vertical axis on said frame and positioned forwardly and rearwardly of the plowshare from which wire and cable may be simultaneously supplied and fed through said guide channels and into the formed furrows in accordance with the rate of advance of the plow, and a reel mounted on a horizontal axis on said frame from which shield wire may be supplied and simultaneously fed with the wire and cable through said guide channels and into the formed furrows to protect the laid wire and cable from electrical disturbances.

2. A wire and cable-laying plow having a wheel supported axle, a frame movable along the axle between the wheels, a plowshare mounted on the frame and movable therewith along the axle to form furrows in accordance with the position of the frame, and reel supporting platforms positioned forwardly and rearwardly of the plowshare and movable laterally on said frame.

3. A wire and cable-laying plow having a wheel supported axle, a frame movable along the axle between the wheels, a furrow-forming plowshare mounted on the frame and movable therewith along the axle, reels mounted on the frame forwardly and rearwardly on the plowshare from which wire and cable may be simultaneously fed through the plowshare and into the formed furrow as the plow advances, and supports for said reels movable laterally on said frame.

4. A wire and cable-laying plow having a frame, a furrow-forming plowshare vertically adjustable thereon and having guide channels extending therethrough, reels mounted on said frame positioned forwardly and rearwardly of the plowshare from which wire and cable may be simultaneously supplied and fed through said guide channels and into the formed furrows in accordance with the rate of advance of the plow, and supports for said reels movable laterally on said frame.

5. A wire and cable-laying plow having a wheel supported axle, a frame adjustably movable along the axle between the wheels, a furrow-forming plowshare vertically adjustable in the frame and having guide channels extending therethrough, reels mounted on said frame positioned forwardly and rearwardly of the plowshare and from which wire and cable may be supplied and simultaneously fed through said guide channels and into the formed furrows in accordance with the rate of advance of the plow, and supporting platforms for the reels movable laterally on said frame.

6. A wire and cable-laying plow having a wheel supported axle, a plowshare carrying frame movable along the axle between the wheels, and cable and wire-carrying reels positioned forwardly and rearwardly of the plowshare and movable laterally on said frame independently of each other.

7. A wire and cable-laying plow having a wheel supported axle, a frame movable along the axle between the wheels, a furrow forming plowshare mounted on the frame and movable therewith along the axle, cable and wire carrying reels positioned forwardly and rearwardly on the plowshare and movable laterally and independently of each other along said frame.

ALBERT E. FREEMAN.
TEMPLE C. SMITH.